(12) United States Patent
Li et al.

(10) Patent No.: US 11,562,460 B1
(45) Date of Patent: Jan. 24, 2023

(54) HIGH PERFORMANCE HARDWARE SCALER

(71) Applicant: Meta Platforms, Inc., Menlo Park, CA (US)

(72) Inventors: Handong Li, Union City, CA (US); Xing Cindy Chen, Los Altos, CA (US); Tuo Wang, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 39 days.

(21) Appl. No.: 17/359,376

(22) Filed: Jun. 25, 2021

(51) Int. Cl.
*G06T 1/20* (2006.01)
*G06T 1/60* (2006.01)
*G06T 3/40* (2006.01)

(52) U.S. Cl.
CPC ............... *G06T 1/20* (2013.01); *G06T 1/60* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 7,016,418 B2 | 3/2006 | Wang | |
| 7,433,522 B2 | 10/2008 | Chang | |
| 7,768,520 B2 | 8/2010 | Deb | |
| 8,155,454 B2 | 4/2012 | Raveendran | |
| 8,462,842 B2 | 6/2013 | Ye | |
| 8,493,415 B2 | 7/2013 | Macinnis | |
| 8,873,637 B2 | 10/2014 | Isani | |
| 8,874,777 B2 | 10/2014 | Ma | |
| 9,172,972 B2 | 10/2015 | Chong | |
| 9,582,852 B2 | 2/2017 | Wallace | |
| 9,799,104 B2 | 10/2017 | Naruse | |
| 9,918,079 B2 | 3/2018 | Xi | |
| 10,863,196 B2 | 12/2020 | Kim | |
| 2015/0296175 A1* | 10/2015 | Wallace | H04N 7/0117 348/445 |
| 2016/0227160 A1* | 8/2016 | Baek | G06T 1/20 |

OTHER PUBLICATIONS

Yao et al., 'Memory-centric scheduling for multicore hard real-time systems', Real-Time Syst. (Year: 2012).*
Rivas et al. ('Implementation of Memory Centric Scheduling for COTS Multi-Core Real-Time Systems', ECRTS 2019, p. 7:1-23. (Year: 2019).*

(Continued)

*Primary Examiner* — Patrick F Valdez
(74) *Attorney, Agent, or Firm* — Van Pelt, Yi & James LLP

(57) ABSTRACT

Various features of a high performance hardware scaler are disclosed herein. In some embodiments, a hardware scaler comprises a first processing unit configured to perform preparation and scaling operations and a second processing unit configured to perform preparation and scaling operations. The first processing unit and the second processing unit alternatively switch between performing preparation and scaling operations when processing a current input pixel block such that the first processing unit performs scaling operations while the second processing unit performs preparation operations and the second processing unit performs scaling operations while the first processing unit performs preparation operations.

20 Claims, 5 Drawing Sheets

(56) References Cited

OTHER PUBLICATIONS

Pham et al., Separable Bilateral Filtering for Fast Video Preprocessing, IEEE International Conference on Multimedia and Expo, Jul. 6, 2005.
Sundar et al., Hardware Acceleration of Video Quality Metrics, Applications of Digital Image Processing XLIII, vol. 11510, Aug. 21, 2020.
Xilinx, LogiCORE IP Video Scaler v6.00.a, Product Guide, PG009 Apr. 24, 2012.

* cited by examiner

HIGH PERFORMANCE HARDWARE SCALER

BACKGROUND OF THE INVENTION

Hardware scalers typically support scaling to standard scaling ratios and often comprise relatively low quality filter configurations. Thus, a more flexible hardware scaler architecture that provides better quality scaling and that does not have at least some of the limitations of existing hardware scaler architectures is needed.

BRIEF DESCRIPTION OF THE DRAWINGS

Various embodiments of the invention are disclosed in the following detailed description and the accompanying drawings.

DETAILED DESCRIPTION

Figure 1:
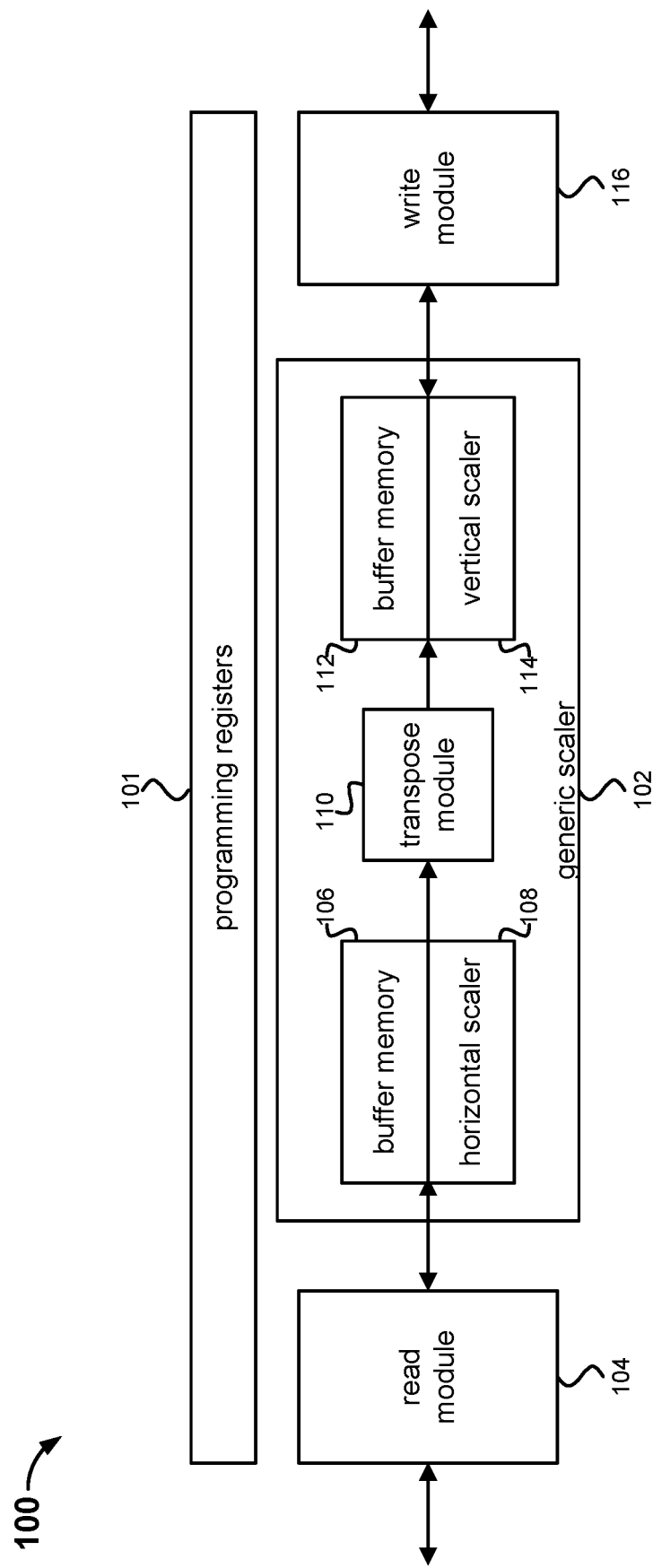
FIG. 1 is a high level block diagram illustrating an embodiment of a scaling unit comprising a generic hardware scaler.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A video scaler comprises a component for transforming video resolution. For example, a video scaler may be employed to convert a video signal from an input resolution to a different output resolution or, equivalently, to resize a video frame from an input frame size to a different output frame size. Video scalers typically scale in both horizontal and vertical directions and typically support both downscaling and upscaling. In downscaling, a higher resolution input signal is converted into a lower resolution output signal. In upscaling, a lower resolution input signal is converted into a higher resolution output signal. Scaling, i.e., generating an output image or frame having a lower or higher number of pixels or more generally having a different pixel composition than an input image or frame, may be facilitated via one or more image processing operations such as interpolation, resampling, filtering, etc. A video scaler may comprise a separate, stand-alone component or device or may be a part of another larger device or system. Moreover, a video scaler may be implemented in software and/or hardware.

While existing software scalers offer more flexibility in terms of scaling ratios, existing hardware scalers are typically limited to supporting common or standard scaling ratios and lack support for unconventional ratios. Therefore, a need exists for a more flexible hardware scaler design that is not limited to fixed ratios but rather that supports a wide and continuous range of scaling ratios or, equivalently, frame sizes. Existing hardware scalers are typically found in resource sensitive mobile applications and thus are often limited to simpler and lower quality filter configurations, such as filters having relatively smaller numbers of taps. Therefore, a need exists for a hardware scaler design comprising more complex filter configurations, such as higher order filters having relatively larger numbers of taps, so that better quality outputs can be achieved. A viable architecture for a hardware scaler furthermore demands efficient resource usage in an associated system. Existing scaler architectures often employ different data paths for downscaling and upscaling operations. Therefore, a need exists for a more resource sensitive hardware scaler design that provides both downscaling and upscaling operations via the same shared data path. As further described in detail herein, various features of a high performance, high quality, and high flexibility hardware video scaler are disclosed. The disclosed scaler architecture not only supports a wide range of input video formats but also supports a continuous range of scaling ratios or output frame sizes while having the resource sensitivity and latency sensitivity to support a wide range of scaling applications, including on-demand and live scaling applications.

FIG. 1 is a high level block diagram illustrating an embodiment of a scaling unit 100 comprising a generic hardware scaler 102. In some embodiments, scaler 102 supports a continuous range of scaling ratios or frame sizes and a plurality of modes of operation, including downscaling and upscaling, over a single generic data path. Scaling unit 100 may comprise a stand-alone component or a component of a system or device. For example, scaling unit 100 may comprise an independent thread of an application-specific integrated circuit such as a video transcoding chip.

Scaling unit 100 or parts thereof may comprise one or more processing units or processors to facilitate supported scaling operations. In order to minimize or reduce resource consumption as well as latency, scaling unit 100 is in some embodiments configured to perform inline processing wherein input data is completely consumed or processed to generate output data via a single traversal of the data path of scaling unit 100, i.e., pixels only pass through scaling unit 100 once for a given scaling operation. Moreover, various data management techniques may be employed with respect to scaling unit 100 for different modes of operation of scaling unit 100 to optimize scaling processing, reduce or minimize the context that needs to be carried from one block to the next when performing block by block scaling operations, and input and output data in prescribed data structures or formats, e.g., tiles, for efficient bandwidth utilization in an associated system.

A simplified block diagram comprising components of scaling unit 100 is illustrated in FIG. 1. Since scaling comprises separable linear operations, scaler 102 in the given embodiment is separated into horizontal and vertical scaling components, i.e., input data is first horizontally scaled and then vertically scaled. However, generally, scaling operations may be performed in any other appropriate order or manner, and scaling unit 100 may comprise any other appropriate combination and configuration of components. Although many of the examples described herein are with respect to scaling video data or frames thereof, the disclosed techniques may be employed with respect to scaling any type of image data comprising pixels.

In scaling unit 100, scaling mode and magnitude are dynamically selected or specified via programming registers 101. That is, a current mode of operation of scaling unit 100 from a plurality of supported modes of operation is selected or specified via programming registers 101. Scaling unit 100 supports downscaling and upscaling and may support one or more other modes of operation such as a one-to-one filtering mode in which pixel interpolation is performed but frame size remains constant as well as a bypass mode. A magnitude or amount of scaling is also selected or specified via programming registers 101. In some embodiments, scaling unit 100 supports a continuous space or range of scaling ratios. For example, in one embodiment, any scaling value from the scaling range of downscaled by 4 to upscaled by 7.5 is supported. In some embodiments, scaling ratio is specified with respect to frame sizes. In such cases, input frame size and desired output frame size are used to specify scaling ratio or factor.

In scaling unit 100, data is input into scaler 102 via read module 104. More specifically, read module 104 of scaling unit 100 facilitates obtaining data from memory or from one or more intermediary components thereof. For example, in one embodiment, read module 104 communicates, e.g., via a double data rate (DDR) channel, with a direct memory access (DMA) interface that interfaces with physical memory. Although data may be organized in physical memory differently, in some embodiments, data read from physical memory is logically translated and communicated to upstream nodes, such as read module 104, in a prescribed data structure or format, such as in blocks or tiles of pixels. For example, in one embodiment, read module 104 receives data in a tile format comprising 64×8 (horizontal×vertical) pixels. Read module 104 may request and receive data in numbers of tiles. Data obtained by read module 104 comprises video data that is communicated on a frame by frame basis. In some cases, pixel blocks or segments comprising a frame are communicated in raster order, i.e., from left to right and from top to bottom of the frame. Moreover, pixel data comprising a frame may furthermore be decoupled into luma and interleaved chroma components. Data requested and received by read module 104 is written into an input buffer, i.e., horizontal scaler buffer memory 106, of scaling unit 100.

Data from horizontal scaler buffer memory 106 is read by and operated on by horizontal scaler 108. That is, data read from horizontal scaler buffer memory 106 is scaled in the horizontal direction by horizontal scaler 108. In some embodiments, a data path of generic scaler 102 supports a plurality of pixels per cycle for parallel processing. As an example, for a data path comprising eight pixels per cycle, a column of eight rows is simultaneously processed by horizontal scaler 108, e.g., using the same set of filter coefficients since vertically aligned rows have the same coordinate or phase. In order to leverage this same parallel processing when vertically scaling, the output of horizontal scaler 108 is transposed by transpose module 110 before being written to vertical scaler buffer memory 112. Data from vertical scaler buffer memory 112 is read by and operated on by vertical scaler 114. That is, data read from vertical scaler buffer memory 112 is scaled in the vertical direction by vertical scaler 114. In various embodiments, the same or different scaling ratios or factors for horizontal scaling and vertical scaling may be selected or specified, e.g., via programming registers 101. The horizontally and vertically scaled output of vertical scaler 114 is written into an output buffer comprising write module 116. Write module 116 furthermore comprises a tile builder for packaging the scaled output of scaler 102 into tile format for communication to other system components, such as back to memory for storage.

Figure 2:
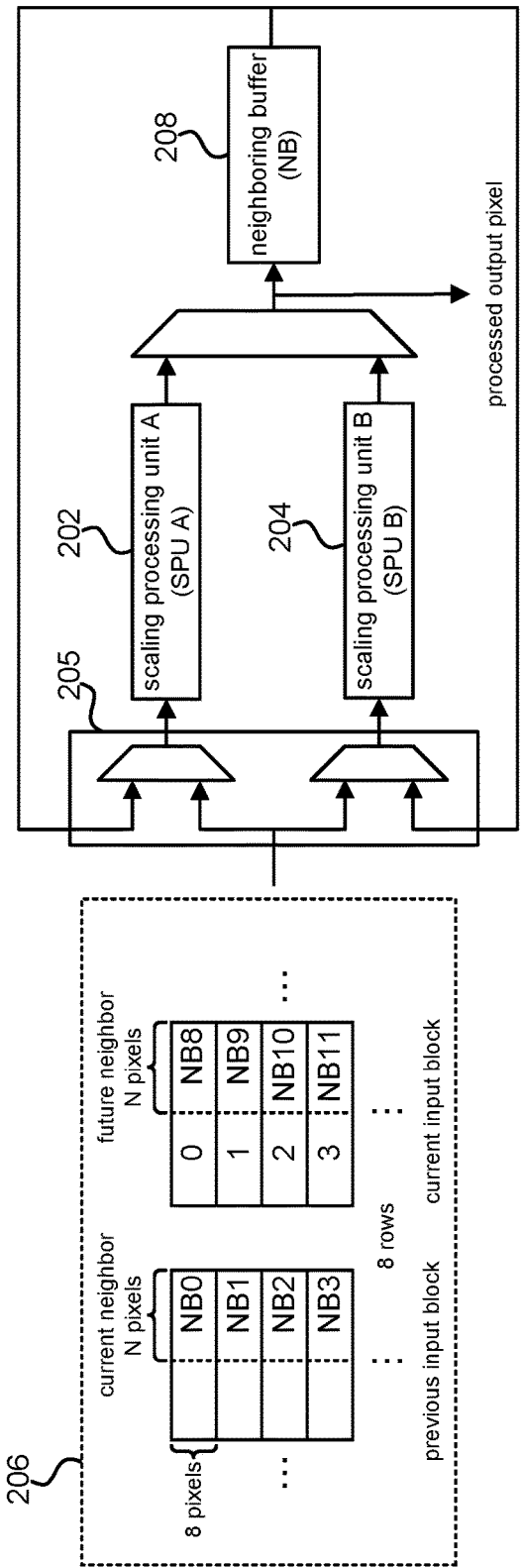
FIG. 2 is a high level block diagram illustrating an embodiment of a scaler.

FIG. 2 is a high level block diagram illustrating an embodiment of a scaler 200. Scaler 200 comprises a plurality of scaling processing units configured to work in parallel in a ping pong scheme in which the processing units context switch between roles of active processing (i.e., scaling or filtering) and active preparation (i.e., storing and/or loading neighbor pixels). A plurality of processing units is employed to perform different tasks in parallel in order to maintain high performance and eliminate latency gaps. In the example of FIG. 2, scaler 200 comprises two scaling processing units—scaling processing unit A (reference numeral 202 in FIG. 2) and scaling processing unit B (reference numeral 204 in FIG. 2). Control unit 205 facilitates or coordinates context switching of the two scaling processing units of scaler 200. Although two scaling processing units are described with respect to the given example, in other embodiments, scaler 200 may comprise any number of processing units that perform various tasks in parallel.

The architecture of scaler 200 may be employed with respect to both horizontal and vertical scalers. For example, scaler 200 may comprise horizontal scaler 108 of FIG. 1 or vertical scaler 114 of FIG. 1. Separate as well as separately or differently configured filters are employed for horizontal and vertical scaling. Thus, horizontal scaling configurability and vertical scaling configurability are decoupled. High precision intermediate results are maintained to ensure a high quality final output.

Scaler 200 may comprise any appropriate combination of one or more of a plurality of types of filters. In various embodiments, filter type, coefficients, and/or number of taps may be dynamically selected or specified for a prescribed scaling operation. In some cases, one or more sets of filter coefficients are dynamically programmed based on a selected or specified scaling operation type and/or ratio. Different sets of filter coefficients and/or different numbers of taps may be employed for different output pixel positions. In some embodiments, in order to support high quality scaling, scaler 200 employs sophisticated pixel interpolation filter configurations that use relatively large numbers of taps and high precision coefficients. For example, in one embodiment, scaler 200 comprises Lanczos filters that are dynamically adjustable to have up to twenty-five taps. A scaling processing unit of scaler 200 may generally comprise a programmable filter having a dynamically adjustable number of taps, e.g., from a prescribed maximum number of supported taps. A number of filter taps may be selected based on scaling ratio, pixel position, as well as desired filtering quality.

For illustrative purposes, FIG. 2 includes an example of input data 206 into scaling processing unit A (reference numeral 202) and scaling processing unit B (reference numeral 204). Input data 206 comprises pixels of a current input block that are read by controller 205 from a corresponding buffer memory (e.g., buffer memory 106 or buffer memory 112 of FIG. 1) and fed by controller 205 in a prescribed manner and order (e.g., row by row) into a scaling processing unit that is currently active for processing or scaling. Input data 206 furthermore comprises current neighbor pixels for currently read input block pixels that are stored in and read from neighbor buffer 208, which in some embodiments comprises an on-chip local memory (e.g., RAM) for storing neighbor pixels. Neighbor buffer 208, for instance, stores left neighbor pixels for horizontal scaling and top neighbor pixels for vertical scaling. Management of neighbor data, e.g., reading and writing of pixels in neighbor buffer 208, is flexible or elastic and may be based on the corresponding input block pixels with respect to which the neighbor data is employed during scaling or filtering. More specifically, the number of neighbor pixels that are stored into and/or read from neighbor buffer 208 may be dynamically determined based on a filter configuration (e.g., number of taps) that is employed for corresponding input block pixels with respect to which the neighbor pixels are used as well as based on corresponding phase.

Scaling processing unit A and scaling processing unit B sequentially operate on adjacent rows of a current input block but are temporally offset by type of active duty. At any given time after initialization, one scaling processing unit is active for processing (i.e., scaling or filtering) while the other scaling processing unit is active for prefetching or more generally preparation (i.e., storing future neighbor pixels that will be used by the next input block and loading current neighbor pixels that were saved from the previous input block). In some embodiments, when configured in a ping pong configuration, the two processing units toggle or switch their roles for every processing row comprising an input block. In FIG. 2, for instance, scaling processing unit A may operate on even processing rows of a current input block while scaling processing unit B may operate on odd processing rows of the current input block. A processing row may comprise a prescribed number of pixels for parallel processing to achieve high efficiency. Horizontal scaling parallel pixel processing is performed for pixels with the same vertical coordinate or phase while vertical scaling parallel pixel processing is performed for pixels with the same horizontal coordinate or phase. In the example of input data 206, a processing row comprises eight pixels in the vertical direction.

Figure 3:
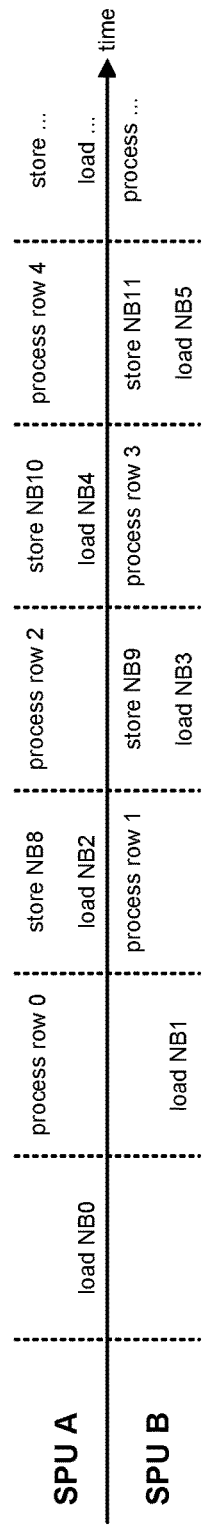
FIG. 3 is a high level timing diagram illustrating an embodiment of a manner in which scaling processing units switch back and forth between tasks.

FIG. 3 is a high level timing diagram 300 of scaler 200 of FIG. 2 illustrating an embodiment of a manner in which scaling processing unit A and scaling process unit B switch back and forth between processing and storing/loading tasks during operation of scaler 200. At each unit of time after initialization, one scaling processing unit is configured as a writer and/or reader of neighbor buffer 208 while the other scaling processing unit is configured as a reader and processor of a current input block. By appropriately managing and switching between at least two threads as depicted in the given example, the latencies associated with storing and reading neighboring pixels are eliminated or hidden since scaler 200 is actively processing input pixels at all times.

Figure 4:
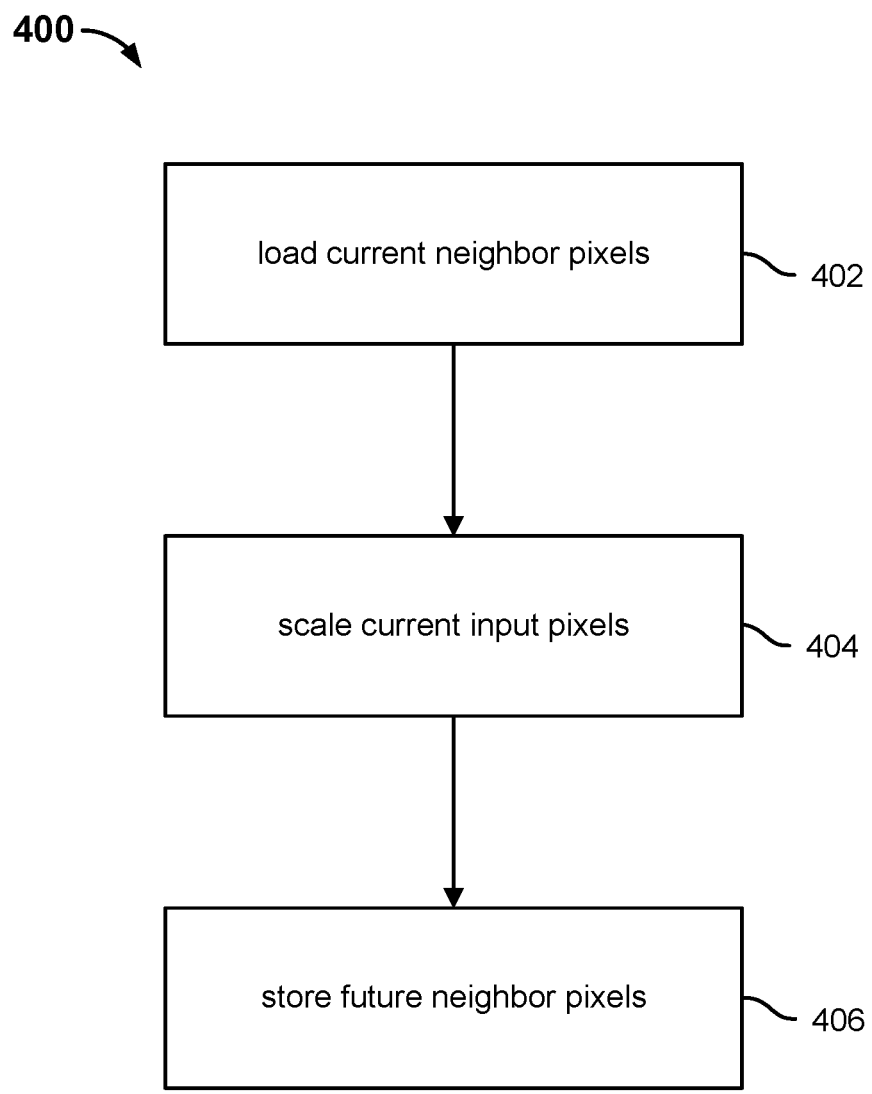
FIG. 4 is a high level flow chart illustrating an embodiment of a process employed by a scaling processing unit.

FIG. 4 is a high level flow chart illustrating an embodiment of a process 400 employed by a scaling processing unit. In some embodiments, process 400 is employed by each of scaling processing unit A (reference numeral 202) and scaling processing unit B (reference numeral 204) of scaler 200 of FIG. 2. Process 400 is iteratively performed as a current input pixel block is processed or scaled row after row alternatively by the two scaling processing units. At step 402, current neighbor pixels are loaded or prefetched, for example, from a memory configured to store neighbor pixels. The neighbor pixels of step 402 are saved from a previous input pixel block. At step 404, current input pixels are scaled. In some embodiments, the input pixels of step 404 comprise a row of the current input pixel block. Scaling of the input pixels at step 404 comprises filtering the input pixels with a filter. In some embodiments, the filter comprises a dynamically adjustable number of filter taps that is based on scaling ratio, pixel position, and/or desired filtering quality. The neighbor pixels prefetched at step 402 are employed during the scaling or filtering operations of step 404. At step 406, portions of the original pixels from the current input pixel block that comprise future neighbor pixels of a next input pixel block are stored, e.g., in the same memory from which current neighbor pixels are prefetched at step 402. Step 402 and step 406 of process 400 comprise preparation operations that include reading current neighbor pixels and writing future neighbor pixels. A number of neighbor pixels that is read or written during preparation operations is based on a number of filter taps used for scaling corresponding input pixels with respect to which the neighbor pixels are used. In some cases, steps 402 and 406 are performed when a scaling processing unit is in a state of performing preparation operations, and step 404 is performed when a scaling processing unit is in a state of performing scaling operations. A scaling processing unit switches between interleaved preparation and scaling states while processing the current input pixel block.

Figure 5:
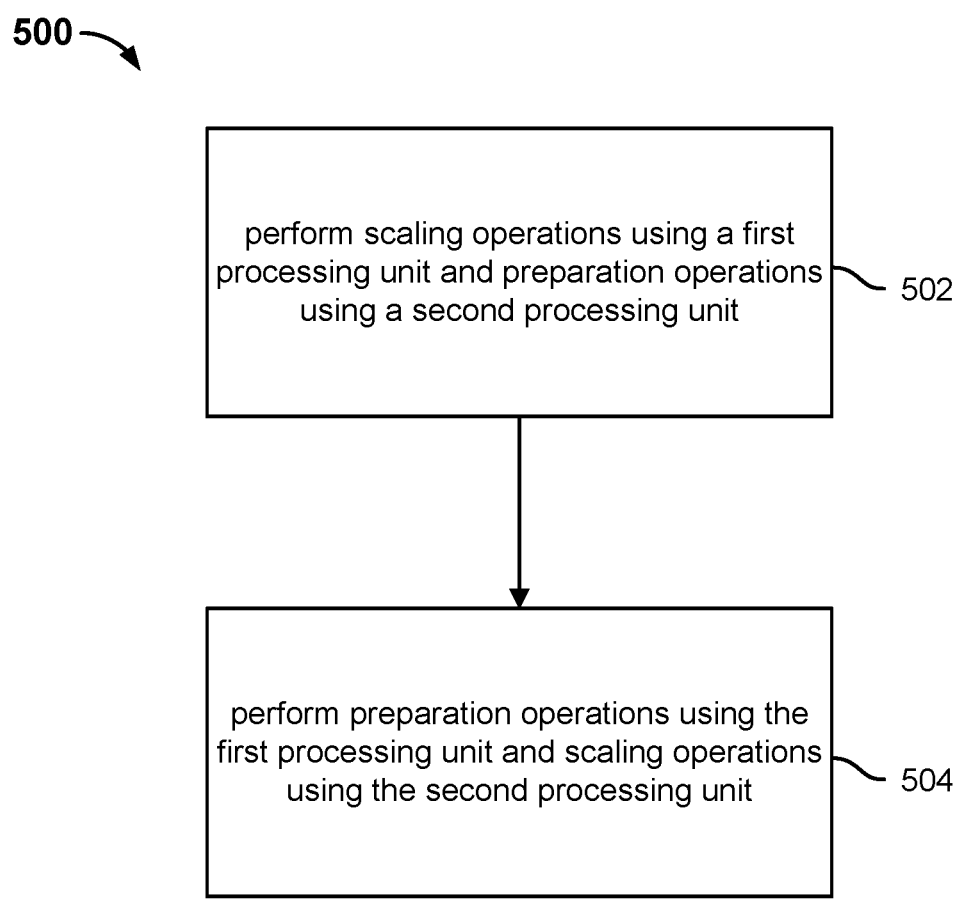
FIG. 5 is a high level flow chart illustrating an embodiment of a process employed by a scaler.

FIG. 5 is a high level flow chart illustrating an embodiment of a process 500 employed by a scaler comprising a first processing unit and a second processing unit. In some embodiments, process 500 is employed by scaler 200 of FIG. 2. At step 502, scaling operations are performed using the first processing unit while preparation operations are performed using the second processing unit. At step 504, preparation operations are performed using the first processing unit while scaling operations are performed using the second processing unit. A scaler iteratively performs process 500 while processing a current input pixel block and alternatively switches between processing units while performing preparation and scaling operations. For example, while the first processing unit performs scaling operations on a prescribed group (e.g., row) of the current input pixel block, the second processing unit performs preparation operations including loading neighbor pixels for scaling a next group (e.g., row) of the current input pixel block and storing neighbor pixels for a next input pixel block. Similarly, while the second processing unit performs scaling operations on a prescribed group (e.g., row) of the current input pixel block, the first processing unit performs preparation operations including loading neighbor pixels for scaling a next group (e.g., row) of the current input pixel block and storing neighbor pixels for a next input pixel block.

As previously described, in some embodiments, the disclosed hardware scaler design offers unprecedented flexibility by supporting a continuous range of scaling ratios within upper and lower limits of the range. A desired scaling ratio or factor for a given scaling operation may be specified with respect to frame sizes, i.e., input frame size and desired output frame size. In many cases, it is not ideal to directly input a scaling ratio value to specify an amount of scaling since the scaling ratio value may suffer from drift effects and result in quality loss for certain input and output frame size combinations. Instead, in some embodiments, a least common multiple of the input and output frame sizes is employed as the processing scale. Such a technique for specifying scale allows operation on an integer basis while maintaining accurate and exact interpolation phase at all output positions.

Figure 6:
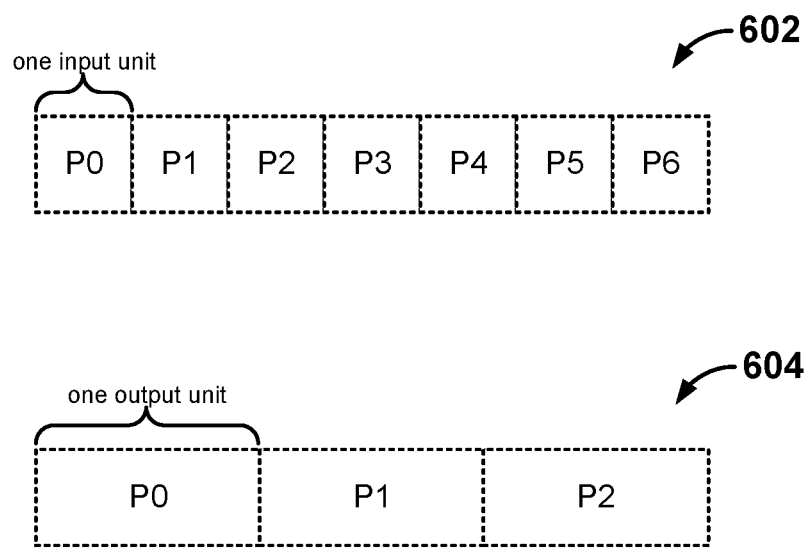
FIG. 6 is a high level block diagram illustrating an embodiment of a manner of traversing an input frame during pixel interpolation using a least common multiple grid.

FIG. 6 is a high level block diagram illustrating an embodiment of a manner of traversing an input frame during pixel interpolation using a least common multiple grid. Generally, when performing pixel interpolation during scaling, a given output pixel position is mapped to the input frame so that input frame pixels that fit within the interpolation kernel can be located. In the example of FIG. 6, an input frame 602 of size 7 is downscaled to an output frame 604 of size 3. If an input unit of the input frame is employed as the overall grid unit, the center of output pixel P0 is at grid unit 7/6, which comprises infinite repeating decimals. Since hardware requires values to be specified using a finite number of bits, the step size for the output frame has to be quantized with such a grid scheme, resulting in both quality loss and phase drift as errors accumulate over a frame. This can be avoided by redefining the overall grid to be the least common multiple of the input and output frame sizes. In such cases, in the example of FIG. 6, the overall grid is 21 wide, each step size from the input frame is 3, and each step size from the output frame is 7. With this grid scheme, the center of output pixel P0 is at 3.5, which when mapped to the input frame falls 0.5 units to the right of input pixel P0. Thus, phase drift and quality loss can be avoided by using a finite and accurate representation of the grid. Moreover, any input-output frame size combination can be described using such a least common multiple grid scheme.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first processing unit configured to perform preparation and scaling operations; and
a second processing unit configured to perform preparation and scaling operations;
wherein the first processing unit and the second processing unit alternatively switch between performing preparation and scaling operations when processing a current input pixel block such that the first processing unit performs scaling operations while the second processing unit performs preparation operations and the second processing unit performs scaling operations while the first processing unit performs preparation operations.

2. The system of claim 1, wherein processing the current input pixel block comprises scaling the current input pixel block.

3. The system of claim 2, wherein while the first processing unit performs scaling operations on a prescribed group of the current input pixel block, the second processing unit performs preparation operations including loading neighbor pixels for scaling a next group of the current input pixel block.

4. The system of claim 3, wherein the second processing unit performs preparation operations including storing neighbor pixels for a next input pixel block.

5. The system of claim 2, wherein while the second processing unit performs scaling operations on a prescribed group of the current input pixel block, the first processing unit performs preparation operations including loading neighbor pixels for scaling a next group of the current input pixel block.

6. The system of claim 5, wherein the first processing unit performs preparation operations including storing neighbor pixels for a next input pixel block.

7. The system of claim 1, wherein preparation operations comprise reading current neighbor pixels and writing future neighbor pixels.

8. The system of claim 1, wherein a number of neighbor pixels that is read or written during preparation operations is based on a number of filter taps used for scaling corresponding input pixels with respect to which the neighbor pixels are used.

9. The system of claim 1, wherein the first processing unit performs interleaved preparation and scaling operations corresponding to even rows of the current input pixel block while the second processing unit performs interleaved preparation and scaling operations corresponding to odd rows of the current input pixel block.

10. The system of claim 1, further comprising a control unit configured to coordinate context switching with respect to the first processing unit and the second processing unit.

11. The system of claim 1, further comprising a memory configured to store the current input pixel block.

12. The system of claim 1, further comprising a memory configured to store current neighbor pixels of the current input pixel block that were saved from a previous input pixel block.

13. The system of claim 1, further comprising a memory configured to store future neighbor pixels to be used by a next input pixel block.

14. The system of claim 1, wherein scaling operations comprise filtering using a filter.

15. The system of claim 14, wherein the filter is dynamically configurable.

16. The system of claim 14, wherein a type, one or more sets of coefficients, and a number of taps of the filter are programmable.

17. The system of claim 14, wherein a number of filter taps to use during scaling is dynamically adjustable based on an output pixel position, a scaling ratio, and a desired filtering quality.

18. The system of claim 1, wherein the current input pixel block comprises a frame of a video.

19. A method, comprising:
performing scaling operations using a first processing unit while performing preparation operations using a second processing unit; and
performing preparation operations using the first processing unit while performing scaling operations using the second processing unit;

wherein the first processing unit and the second processing unit alternatively switch between performing preparation and scaling operations when processing a current input pixel block.

20. A computer program product embodied in a non-transitory computer readable medium and comprising computer instructions for:

performing scaling operations using a first processing unit while performing preparation operations using a second processing unit; and performing preparation operations using the first processing unit while performing scaling operations using the second processing unit;

wherein the first processing unit and the second processing unit alternatively switch between performing preparation and scaling operations when processing a current input pixel block.

\* \* \* \* \*